(12) United States Patent
Hallmann et al.

(10) Patent No.: US 12,690,717 B2
(45) Date of Patent: Jul. 28, 2026

(54) GRIND SIZE ADJUSTMENT ASSEMBLY COMPRISING A COFFEE MACHINE, COFFEE MACHINE OF AN ASSEMBLY OF THIS TYPE, AND METHOD FOR ADJUSTING THE GRIND SIZE

(71) Applicant: Melitta Professional Coffee Solutions Gmbh & Co. KG, Minden (DE)

(72) Inventors: Kai Hallmann, Minden (DE); Armin Hensel, Rahden (DE); Bernd Buchholz, Rahden (DE)

(73) Assignee: Melitta Professional Coffee Solutions GmbH & Co. KG, Minden (DE)

( * ) Notice: Subject to any disclaimer, the term of this patent is extended or adjusted under 35 U.S.C. 154(b) by 969 days.

(21) Appl. No.: 17/908,297

(22) PCT Filed: Apr. 1, 2021

(86) PCT No.: PCT/EP2021/058643

§ 371 (c)(1),
(2) Date: Aug. 31, 2022

(87) PCT Pub. No.: WO2021/204682

PCT Pub. Date: Oct. 14, 2021

(65) Prior Publication Data

US 2023/0125039 A1 Apr. 20, 2023

(30) Foreign Application Priority Data

Apr. 6, 2020 (DE) ..................... 10 2020 109 527.9

(51) Int. Cl.
*A47J 42/18* (2006.01)
*A47J 42/38* (2006.01)

(52) U.S. Cl.
CPC .............. *A47J 42/18* (2013.01); *A47J 42/38* (2013.01)

(58) Field of Classification Search
None
See application file for complete search history.

(56) References Cited

U.S. PATENT DOCUMENTS

2010/0198413 A1* 8/2010 De' Longhi ............ A47J 31/42
700/275
2016/0058244 A1* 3/2016 Laffi ........................ A47J 31/42
241/36
(Continued)

FOREIGN PATENT DOCUMENTS

EP 3 542 682 A1 9/2019
WO WO-2015143677 A1 * 10/2015 .......... A47J 43/0465
(Continued)

OTHER PUBLICATIONS

International Search Report in PCT/EP2021/058643, mailed Jun. 8, 2021.
(Continued)

*Primary Examiner* — John J Norton
(74) *Attorney, Agent, or Firm* — Collard & Roe, P.C.

(57) ABSTRACT

A grind size adjustment assembly has at least one coffee machine with at least one grinder for grinding coffee beans. The at least one grinder has a first grinding disc, a second grinding disc and a drive unit, via which at least one of the two grinding discs is rotatably operated, as well as a control unit. The grind size adjustment assembly also has at least one server, wherein the at least one grinder has at least one sensor unit. A coffee machine is provided. A method for grind size adjustment in a grind size adjustment assembly and a method for telemetrically adjusting the grind size in a grind size adjustment assembly are also provided.

15 Claims, 4 Drawing Sheets

(56) References Cited

U.S. PATENT DOCUMENTS

Figure 1:
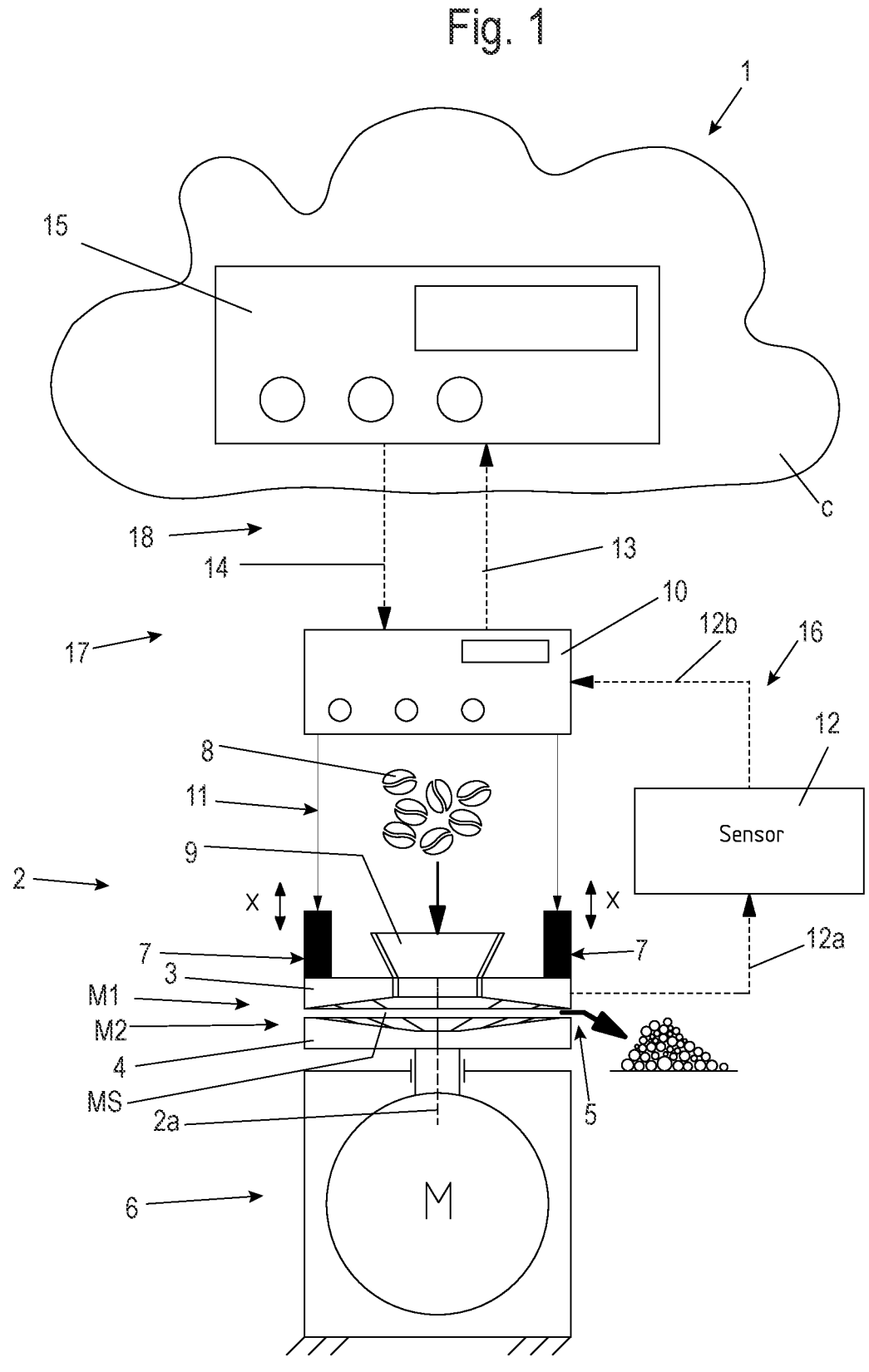

| | | |
|---|---|---|
| 2016/0235249 A1 | 8/2016 | Teahan |
| 2018/0055288 A1 | 3/2018 | Rose et al. |
| 2021/0235934 A1 | 8/2021 | Hensel et al. |

FOREIGN PATENT DOCUMENTS

| | | |
|---|---|---|
| WO | 2020/002493 A1 | 1/2020 |
| WO | 2020/081511 A1 | 4/2020 |

OTHER PUBLICATIONS

German Search Report dated Jan. 22, 2021 in German Application No. 10 2020 109 527.9 with English translation of relevant parts.

* cited by examiner

GRIND SIZE ADJUSTMENT ASSEMBLY COMPRISING A COFFEE MACHINE, COFFEE MACHINE OF AN ASSEMBLY OF THIS TYPE, AND METHOD FOR ADJUSTING THE GRIND SIZE

CROSS REFERENCE TO RELATED APPLICATIONS

This application is the National Stage of PCT/EP2021/058643 filed on Apr. 1, 2021, which claims priority under 35 U.S.C. § 119 of German Application No. 10 2020 109 527.9 filed on Apr. 6, 2020. The international application under PCT article 21 (2) was not published in English.

The invention relates to a grind size adjustment assembly having a coffee machine according to the preamble of claim 1, as well as to a coffee machine, in particular a fully automatic coffee machine, having such an assembly, and to a method for adjusting the grind size.

In the prior art, there are essentially two proven types of coffee grinders used in coffee machines. One is a disc grinder and the other is a cone grinder. Both types of grinders have in common that they consist of two grinding tools, one of which is fixed and the other driven. The rotational movement of one of the grinding tools draws the coffee beans to be ground into a grinding gap and grinds them increasingly finer as the grinding gap narrows. The smallest distance between the two tools is decisive for the grind size produced in the coffee powder.

To regulate the particle fineness in such conventional coffee grinders, the distance between the two grinding tools is changed. The grinding tool, which is mounted in a non-rotating manner, can be geometrically changed relative to the other, driven grinding tool. The adjustment is carried out manually or via an electric adjustment unit. The change in the grind size is geometrically very sensitive. The optimum setting is located in a window of only a few hundredths of a millimeter, which is also dependent on the type of coffee and the desired extraction strength for the product.

A not yet published application of the applicant describes an alternative force-controlled method to adjust the fineness of the coffee powder. It is shown that the particle size of the ground coffee is related to the axial force acting between the grinding tools during the grinding process. The finer the powder, the greater the force. Furthermore, it is described that one of the grinding tools is mounted in a rotationally fixed manner and at the same time has an axial degree of freedom. A defined force is applied to the grinding tools from the outside in order to provoke a desired grind size.

The invention therefore has the object of creating a grind size adjustment assembly which advantageously improves a regulation of the particle fineness of a grinder of a coffee machine, increases its service life and thus offers cost advantages.

A grind size adjustment assembly according to the invention, in particular a telemetric grind size adjustment assembly, comprising at least one coffee machine having at least one grinder for grinding coffee beans, wherein the at least one grinder comprises a first grinding disc, a second grinding disc and a drive unit by means of which at least one of the two grinding discs is rotatably driven, as well as a control unit. The grind size adjustment assembly further comprises at least one server, and the at least one grinder comprises at least one sensor device.

In one embodiment, it is provided that the sensor device forms or has at least one indication of a fineness adjustment and/or a force generation device of the grinder of the coffee machine. Thus, a simple and quick adjustment of the grind size of the grinder can be made.

In one embodiment, the at least one server may be a service provider, e.g., a telephone hotline/consulting service. Thus, a user of the coffee machine can make a quick and easy grind size adjustment based on the indicated setting value and information from the server.

In a further embodiment or in addition, the at least one server may be a higher-level control device and may be connected to the coffee machine, which comprises the at least one grinder, via the control unit in a wired or/and wireless manner. In this way, convenience for the user may be increased.

A coffee machine according to the invention, in particular a fully automatic coffee machine, forms a component of the grind size adjustment assembly described above.

A method according to the invention for adjusting the grind size of an above-mentioned grind size adjustment assembly having a coffee machine comprises the method steps of (VS1) inputting a reference variable (target value) for a grind size of a grinder into a fineness adjustment or force generation device of grinding tools of a grinder of the coffee machine before operation or during operation of the grinder; (VS2) detecting forces or/and positions of the grinder by means of a sensor device, generating a corresponding indication signal of the fineness adjustment or force generation device; and (VS3) comparing the indication signal thus obtained with the reference variable (target value) or with a reference variable obtained from a server and setting the fineness adjustment or force generation device of the grinder of the coffee machine for adjusting the grind size of the grind size adjustment assembly.

Another method according to the invention for telemetric grind size regulation of the above-described grind size adjustment assembly has the method steps of (VS1) inputting a reference variable (target value) for a grind size of a grinder before operation or during operation of the grinder into a regulating unit of a control unit or a server communicating with the control unit, wherein the regulating unit adjusts grinding tools of the grinder by means of a fineness adjustment or force generation device by means of an actuating signal; (VS2) detecting forces or/and positions of the grinder by means of a sensor device, generating a corresponding measuring signal and forwarding the measuring signal to the regulating unit; and (VS3) comparing the measuring signal thus obtained with the reference variable (target value) and forming a corresponding actuating signal for regulating the grind size of the grinder.

A particular advantage here is that a central setting of individual or several grinders to desired (e.g. identical) fineness levels and thus comparable product settings to achieve defined quality standards of several coffee machines (chain customers) can be made possible by controlling the machines via telemetric access, in that the grinders can be adjusted geometrically or force-controlled via a server using their manual or electrical fineness adjustment.

For this purpose, it is provided in one embodiment that the control unit is designed as an interface that transmits data from the sensor device to the at least one server and receives data from the server. In this way, it is advantageously possible for the control unit to be connected to the server via the Internet and/or an intranet, for example.

A force-grind size relationship can be used to ideally adjust the grinders of the coffee machine by means of telemetry, to monitor them and to regulate them in relation to influencing variables. Influencing variables can be, for example, the change of coffee beans, changes in product settings or temperature fluctuations directly in the coffee machine.

Advantageous further developments of the invention are indicated by the subject matters of the subclaims.

In a further embodiment, the control unit has a regulating unit and, together with the sensor device and a fineness adjustment and/or a force generation device of the grinder, forms a control loop for regulating a grind size of the grinder. This is advantageous because the control unit thus has several functions.

In a yet further embodiment, the control unit is connected to the at least one server via a telemetry link, wherein the grind size adjustment assembly forms a telemetric grind size adjustment assembly. Thus, wireless connectivity is also advantageously used.

For an advantageous use of the server, the at least one server is designed in such a way that the at least one server transmits to the control unit predefined data for the fineness adjustment and/or the force generation device of the grinder. Thus, the predetermined data can be stored once only in the memory of the server and can be used for many other coffee machines connected thereto.

In a yet further advantageous embodiment, the at least one server can perform monitoring of the grinder by means of the data received from the control unit. This enables a central grinding fineness adjustment with the aid of sensory auxiliary variables that allow a statement to be made about the absolute position (force or geometry) on the grinding tools.

In a further embodiment, the at least one server has a regulating unit and forms a control loop with the control unit, the sensor device and the fineness adjustment and/or the force generation device of the grinder for regulating a grind size of the grinder. This is advantageous because the control unit of each coffee machine thus does not have to have a regulating unit.

It is also advantageous if the at least one server is connected to at least two coffee machines by means of the telemetry link and regulates their respective grinders and evaluates their data. Of course, considerably more coffee machines can also be connected to the server in this way.

It is advantageous if the at least one server is located in a cloud.

Another advantageous embodiment of the further method provides that the measuring signal is transmitted by the control unit to a server in a cloud via a telemetry link, and that the server transmits the actuating signal to the control unit via the telemetry link.

In addition, the control unit can transmit additionally recorded parameters, such as temperature, to the server, wherein the server performs various evaluations from the values thus obtained, recorded measuring signals and control signals. This results in the advantage of recording and evaluating sensory auxiliary variables that provide a statement about the current axial force between the grinding tools in order to determine a degree of wear of the grinding tools.

For further advantageous designs can be inferred from the remaining subclaims.

The following advantages can be achieved with the invention:

Fast initial adjustment of a grinder (especially in case of defined factory setting, grinding tool change or removal of foreign bodies from the grinder)

Fineness adjustment when changing beans

Direct control or regulation of the grinder with regard to particle fineness (cf. indirect regulation via extraction time of the coffee cake)

Compensation of thermal expansion effects

Actual position determination of the grinder possible by remote diagnosis

Determination/setting of an absolute grind size

Continuous diagnosis of wear effects on the grinding tools for e.g. maintenance planning Central adjustment of individual or multiple grinders to desired (e.g. identical) fineness levels and thus comparable product settings to achieve defined quality standards of multiple coffee machines (chain customers) by controlling the machines via a respective telemetry link, in that the grinders can be adjusted geometrically or force-controlled via their manual or electrical fineness adjustment via the central Cloud C.

Figure 2:
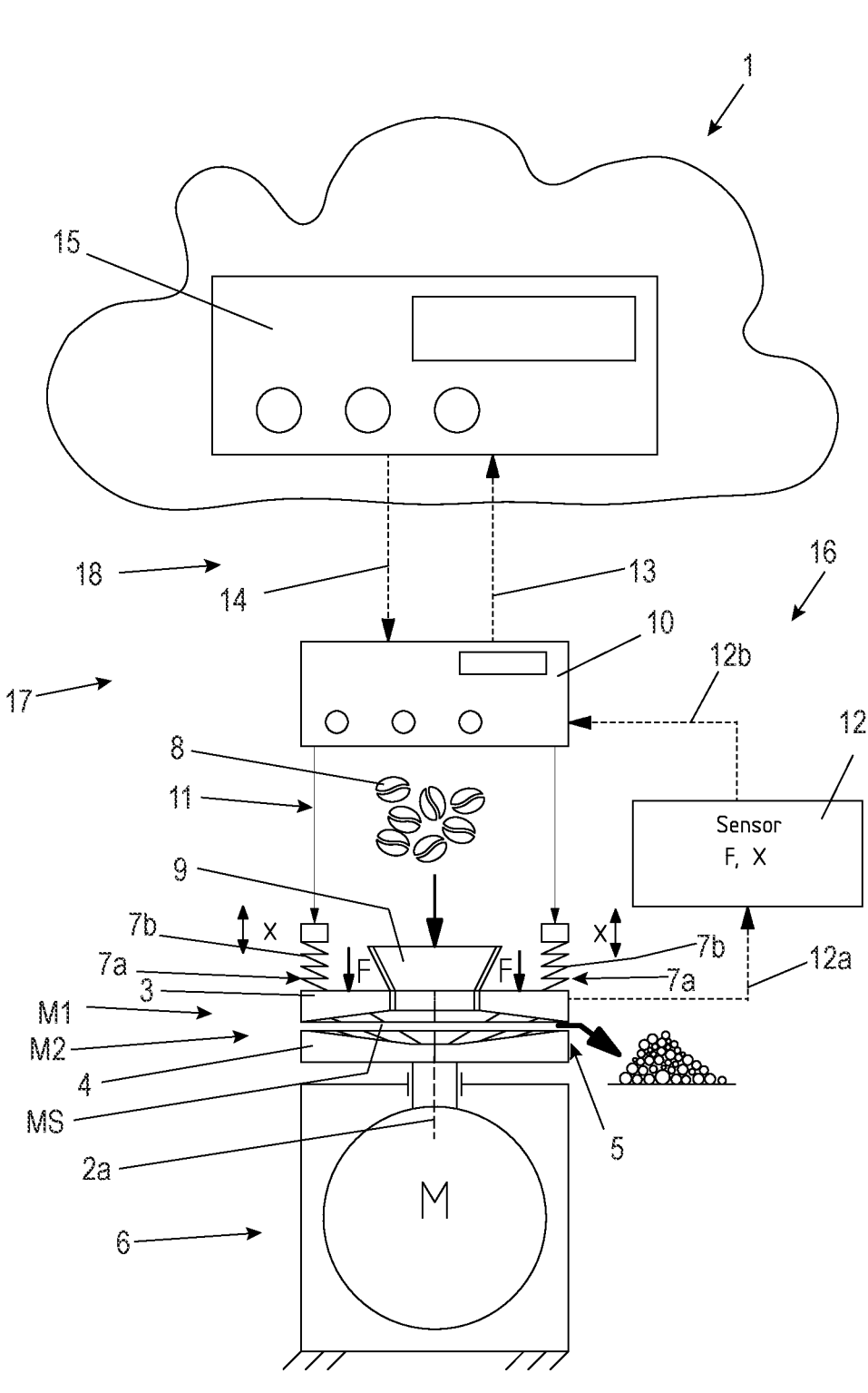
Figure 3:
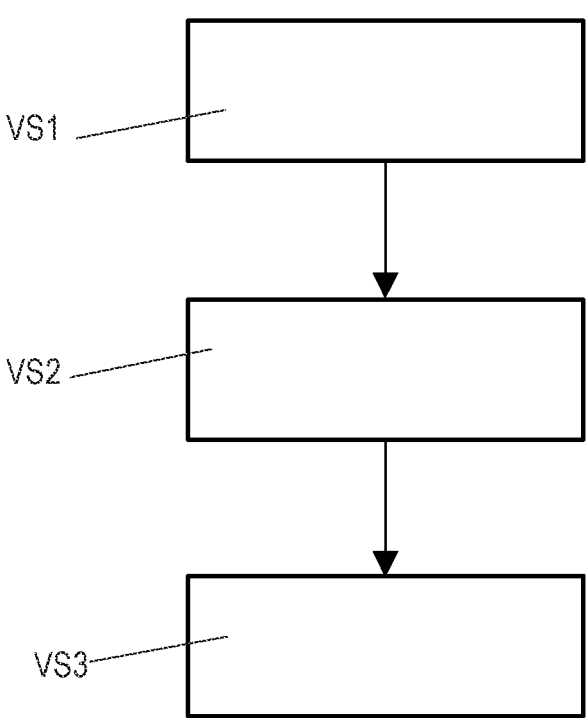

In the following, the invention is described in more detail by means of an exemplary embodiment with reference to the drawings. The figures serve only to explain the invention in more detail and are not restrictive of the invention. Individual described features can also be transferred per se to further embodiment variants within the scope of general expertise, wherein:

FIG. 1: shows a schematic view of a grind size adjustment assembly according to the invention with a front view in section of a principle of a grinder for grinding coffee beans;

FIG. 2: shows a schematic view of a variant of application 5 according to the invention according to FIG. 1;

FIG. 3: shows a schematic flow chart of an exemplary method; and

Figure 4:
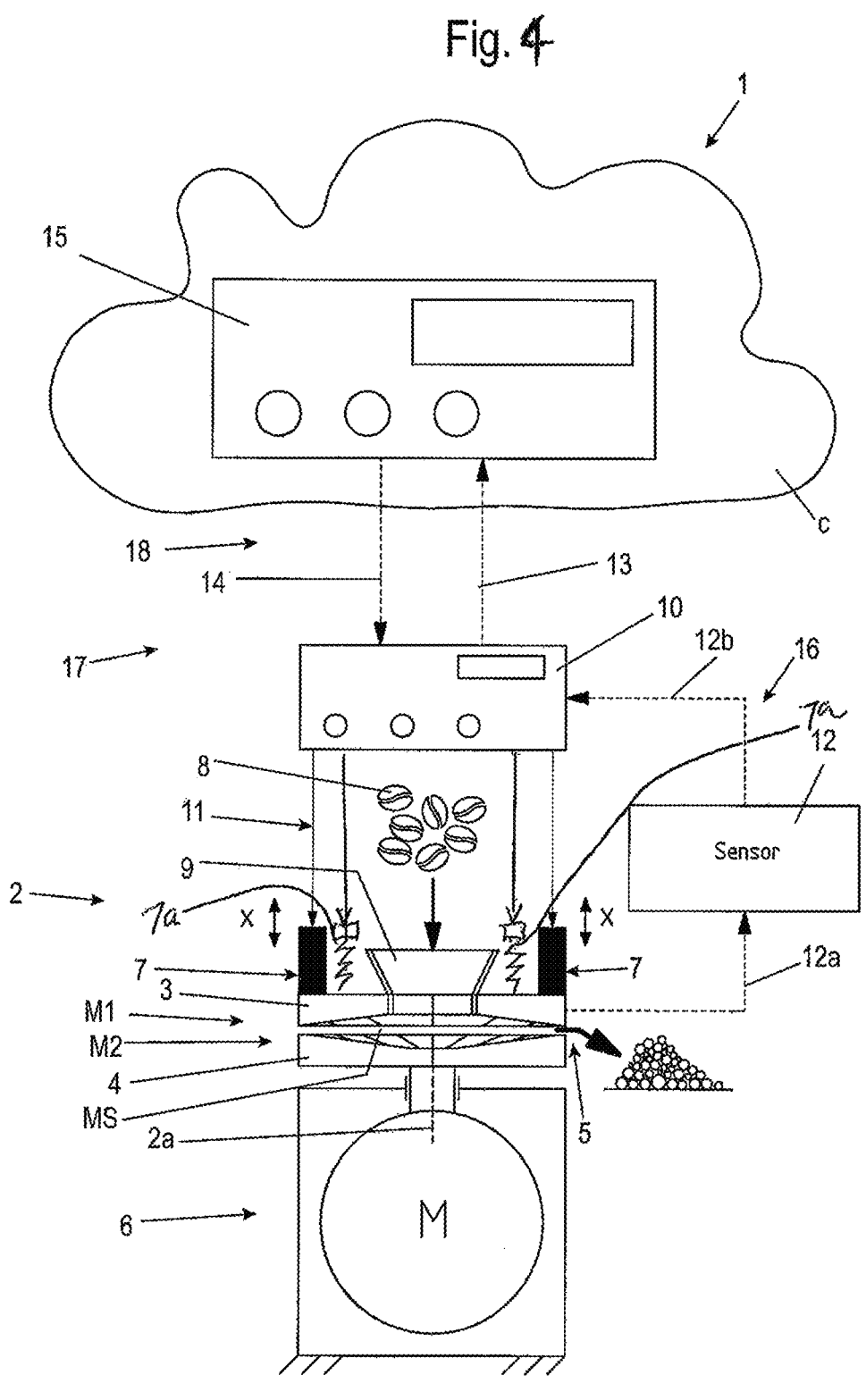

FIG. 4: A schematic view of a variant of the invention according to FIGS. 1 and 2.

In FIG. 1, a schematic view of a grind size adjustment assembly 1 according to the invention is shown with a front view in section of a principle of a grinder 2 for grinding coffee beans 8.

In this exemplary embodiment, the grind size adjustment assembly 1 comprises a grinder 2, a sensor device 12, and a server 15.

The term "server" 15 shall be understood herein to mean the following.

In a simple embodiment, the server 15 may be a service provider, e.g., a telephone hotline/consulting service, etc.

In a further design, the server 15 can be arranged as a type of higher-level control device, e.g. in the vicinity of a coffee machine that has the grinder 2, and can be connected to the coffee machine by wire or/and wirelessly. Further coffee machines with grinders 2 can also be assigned to the server 15.

The server 15 as a higher-level control device can be, for example, a computer that is connected to a local network and receives and provides information via this network. Software installed on a network computer and performing the above tasks can also be the server 15.

In the exemplary embodiment shown herein, the server 15 is located in or connected to a so-called cloud C.

Of course, it is also conceivable that the server 15 is additionally present as a service provider.

The grinder 2 has a grinder axis 2a, a first grinding disc carrier M1 with a first grinding disc 3, a second grinding disc carrier M2 with a second grinding disc 4, and a drive unit 6. The grinding discs 3, 4 are also referred to as grinding tools. The first grinding disc 3 is rotationally supported in the first grinding disc carrier M1. In this respect, the first grinding disc 3 is stationary during operation of the grinder 2.

The first grinding disc 3 can also be designed differently, e.g. as a grinding cone. A feed hopper 9 extends through an undesignated opening of the first grinding disc 3. Coffee beans 8 to be ground are fed to the grinder 2 through the feed hopper 9 and the opening. The grinder 2 may also be provided for grinding other luxury foods or foodstuffs, but preferably it is provided for grinding coffee beans 8.

The grinding discs 3, 4 are arranged with their grinding sides facing each other and form between them an unde- scribed grinding chamber which opens out at its outer circumference into a grinding gap MS. Attached to the grinding gap MS is an ejection section 5, not shown in more detail, having a collecting device (not shown here) which collects the coffee beans—preferably coffee powder— emerging from the grinding gap MS and feeds them to an extraction process.

The second grinding disc 4 can also be designed differ- ently, e.g. as a grinding cone. The second grinding disc 4 is rotatable relative to the first grinding disc 3 about the grinder axis 2*a*. Here, the second grinding disc 4 is coupled to the drive unit 6 in such a way that the second grinding disc 4 is set into a rotary motion during operation of the grinder 2, while the first grinding disc 3 is stationary.

This is advantageous, but not mandatory. Alternatively, the first grinding disc 3 can be rotatable while the second grinding disc 4 is stationary. It is also possible for both grinding discs 3, 4 to be rotatable—e.g. in opposite direc- tions of rotation and/or at different speeds, so that there is always a relative movement between the two grinding discs 3, 4.

The grinder 2 also has at least one fineness adjustment 7. The fineness adjustment 7 acts here on the first grinding disc 3, which is here secured against rotation and has an axial degree of freedom in the direction of the grinder axis 2*a*. The fineness adjustment 7 can also act on the second rotatable grinding disc 4 or on both grinding discs 3, 4.

In an embodiment not shown, the fineness adjustment 7 is designed for manual adjustment.

The fineness adjustment 7 can also be driven, for example, by an electric motor, such as a stepper motor or servomotor, which is controlled by a control unit 10. The control unit 10 also controls the drive unit 6, which has an electric drive.

Furthermore, the grinder 2 can be advantageously adjusted by means of the fineness adjustment 7 depending on the coffee beans 8 to be ground and the respective desired grind size.

In the case of a manual fineness adjustment 7, for example, a display, e.g. with a scale, is coupled to the fineness adjustment 7. The sensor device 12 can also form or comprise the display of the fineness adjustment 7. Thus, by means of the fineness adjustment 7, an adaptation of a grind size to the respective coffee beans 8 to be ground can be carried out, e.g. on the basis of a table in which a setting value is assigned to respective coffee bean types.

If the fineness adjustment 7 is driven by an electric motor, data records regarding the respective grind size, the type of bean and the values to be set for the fineness adjustment 7 are preferably stored for this purpose in a data memory of the control unit 10 for controlling a coffee machine and in particular the grinder 2. The aforementioned control unit 10 can be assigned to the grinder 2 or be part of a coffee machine, e.g., a fully automatic coffee machine.

In the simplest embodiment of the server 15 as a service provider indicated above, the server 15 can be used by a user of the coffee machine comprising the grinder 2 to obtain information on how to adjust the grind level of the grinder 2 for certain types of coffee beans. In this way, by means of the service provider, the user can make an adjustment of the grind size in such a way that the grind size is adapted to the type of coffee beans and/or the taste of the user.

In a further design, the grinder 2 has a sensor device 12 that communicates with the control unit 10. The control unit 10 can transmit the measured values determined by the sensor device 12 with regard to the grinder 2 (e.g. current data on the grinding process, temperatures, setting of the fineness adjustment 7), to the server 15 (to the service provider, to the server 15 as a higher-level control device in the vicinity of the coffee machine, to the server 15 in the cloud C). Based on this data, the server 15 can perform monitoring of the coffee machine. The service provider can use this data to assist in communicating with a user to improve the grind size adjustment, as well as to make changes and adjustments to subsequent versions of the coffee machines.

In a further design, the server 15 can actuate the fine adjustment 7 by means of the control unit 10 to adjust the grind size of the grinder 2, e.g. during initial commissioning. This is also possible, for example, in order to carry out a grind size adjustment for a series of grinders 2 in a number of coffee machines, e.g. in a department or during initial commissioning. It is also conceivable that the server 15 can perform general adjustments, e.g. improvements, updates, etc., based on the data from the sensor device 12.

The exemplary embodiment shown has a grinder 2 with the sensor device 12, which is part of a control loop 16. The control loop 16 is formed by the control unit 10, which is designed for this purpose with a regulating unit, the sensor device 12 and the fine adjustment 7. The regulating unit of the control unit 10 has a comparison device which forms a difference between a reference variable, which is derived from the data records stored in a memory of the control unit 10, and a controlled variable detected by the sensor device 12. From this difference, the regulating unit generates an actuating signal for the fineness adjustment 7. Behind one of the grinding tools, in this case the first grinding disc 3, a transducer of the sensor device 12 is then arranged (e.g. load cell, hydraulic pressure sensor), which determines e.g. a force as measured variable 12*a* of the grinding process. This measured variable 12*a* is fed by the sensor device 12 as a measuring signal 12*b* to the comparison device as a recorded controlled variable.

The transducer for a sensory evaluation of the sensor device 12 may be based on the following measurement principles, for example:

Strain gauges on the grinding tool 3, 4

Pressure sensor on the grinding tools 3, 4 (load cell, hydraulic pressure sensor)

Measurement of the deflection of a back pressure plate (spring plate) for the coffee grounds in the ejection section 5

The control unit 10 is also designed here as an interface that communicates with the server 15 in the cloud C. For this purpose, the control unit 10 is connected to the server 15 in the cloud C via transmission links 13, 14 of a telemetry link 18.

The telemetry link 18 can be or have, for example, an Internet connection. The transmission link 13 is used to transmit data, e.g. measurement data of the sensor device 12 (e.g. current data on the grinding process, temperatures, etc.) and of the fineness adjustment 7, to the server 15. By means of the transmission link 14, data, e.g. manipulated variables for the fineness adjustment 7, are transmitted from the server 15 to the control unit 10.

The force-grind size relationship described above can be used to ideally adjust the grinder 2 or grinders 2 of a coffee machine by means of telemetry, to monitor them and to regulate them in relation to influencing variables. Influencing variables can be, for example, the change of coffee beans 8, changes in product settings or temperature fluctuations directly in the coffee machine.

By means of this data transmission from the control unit 10 to the server 15, it is possible that a remote grind size diagnosis and adjustment can be performed by the server 15.

Here, it is also possible that the server 15 comprises the regulating unit and is thus a component of a telemetry control loop 17, wherein the control unit 10 forms an interface to the server 15 on the one hand and the control for the fineness adjustment 7 on the other hand.

Since the axial force-fineness relationship of different beans of a grinder 2 can be determined empirically, the grinder is able to set desired grind sizes via the electrical fineness adjustment 7 and to regulate these against disturbing factors.

FIG. 2 shows a schematic view of a variant of the grind size adjustment assembly 1 according to the invention as shown in FIG. 1.

In this variant, the grinder 2 further has at least one force-generating device 7a. Here, the force-generating device 7a acts on the first grinding disc 3. As a result, a respective force F acts continuously on coffee beans 8 located between the first grinding disc 3 and the second grinding disc 4. This is advantageous, but not mandatory. The force generation device 7a can also act on the second rotatable grinding disc 4 or on both grinding discs 3, 4.

In this case, the force generation device 7a comprises two force storage elements 7b in the form of compression springs, which can be pretensioned by a variable pretensioning travel X by means of a corresponding device, for example by a servomotor, which is not described and not discussed further here, so that the respective force F acting on the first grinding disc 3 and thus on the coffee beans 8 is variable or adjustable in its amount. The force storage elements 7b exert an axial force that can be adjusted or changed in this way in the direction of the grinder axis 2a perpendicular to a plane of the grinding gap MS on the first and/or second grinding disc 3, 4.

Furthermore, the force acting on the coffee beans 8 by the grinder 2 can be advantageously set by the force generation device 7a depending on the coffee beans 8 to be ground and the respective desired grind size. Preferably, data records relating to the respective grind size, the type of bean and the force to be generated by the force-generating device 7a are stored for this purpose on a data memory of a control unit 10 for controlling a coffee machine and, in particular, the grinder 2. The aforementioned control unit 10 can be assigned to the grinder 2 or be part of a coffee machine, for example a fully automatic coffee machine.

The control loops 16 and 17 are constructed as described above in connection with FIG. 1.

The setting of the grinder 2 by means of pressure transducers of the sensor device 12 or force generation of a spring travel of the force storage elements 7b designed as compression springs can be regulated very precisely compared to the purely geometric adjustment of the grinding tools 3, 4. Above all, an absolute value of the grinding fineness can be defined independently of the component tolerances of the grinder components. Valuable information can thus be obtained from the sensory pressure/force signal (measuring signal 12b) and in turn converted by the regulating unit into a required actuating signal. This information can of course also be integrated into the higher-level telemetry control loop 17 as already described above. Thus, sensory pressure signals of any number of coffee machines can be transmitted to the higher-level server 15, so that a precise statement can be made about the grind size of each individual machine or each individual grinder 2. In addition, specific adjustments to the grind size can be made by establishing the closed control loop from the sensor signal (measuring signal 12b) and the actuating signal via active connection 11.

Also in this variant, the transducer for a sensory evaluation of the sensor device 12 may be based, for example, on the following measurement principles:

Strain gauges on the grinding tool 3, 4

Pressure sensor on the grinding tools 3, 4 (load cell, hydraulic pressure sensor)

Force-displacement relationship of a spring pack of the force storage elements 7b on the grinding tools 3, 4 (e.g. sensory displacement evaluation inductively, capacitively, etc.).

Measurement of the deflection of a back pressure plate (spring plate) for the coffee grounds in the ejection section 5

There are also the following advantages:

Fast initial adjustment of a grinder 2 (especially in case of defined factory setting, change of grinding tools or removal of foreign bodies from the grinder 2)

Fineness adjustment when changing beans

Direct control or regulation of grinder 2 with regard to particle fineness (cf. indirect control via extraction time of coffee cake)

Compensation of thermal expansion effects

Actual position determination of the grinder 2 possible by remote diagnosis

Determination/setting of an absolute grind size

Continuous diagnosis of wear effects on the grinding tools 3, 4 for e.g. maintenance planning Central setting of individual or multiple grinders 2 to desired (e.g. identical) fineness levels and thus comparable product settings to achieve defined quality standards of multiple coffee machines (chain customers) by controlling the machines via a respective telemetry link 18, in that the grinders 2 can be adjusted geometrically or force-controlled via their manual or electrical fineness adjustment 7 via the cloud C.

FIG. 3 shows a schematic flow diagram of an exemplary method for telemetric grind size regulation.

In a first method step VS1, prior to operation or during operation of the grinder 2, a reference variable (target value) for a grind size of the grinder 2 is input to the regulating unit, which adjusts the grinding tools, e.g. grinding discs 3, 4 of the grinder 2 accordingly via a fineness adjustment 7 or force generation device 7a via an actuating signal.

The reference variable can be stored in advance in a memory of the control unit. In addition, the reference variable can be entered manually by means of a corresponding input device.

The regulating unit is part of the control unit 10 or the server 15.

Thereupon, in a second method step VS2, this setting is detected by means of the sensor device 12 during operation of the grinder 2, and the sensor device 12 forwards a measuring signal 12b (actual value) generated therefrom to the regulating unit of the control unit 10.

The measuring signal 12b is transmitted by the control unit 10 to a server 15 in a cloud C via a telemetry link 18.

The regulating unit uses a comparison of the reference variable (target value) and the measuring signal (actual value) thus obtained to form an actuating signal for regulating the grind size of the grinder 2 in a third method step VS3.

The actuating signal is transmitted via the telemetry link 18 to the control unit 10, which adjusts the fineness adjustment 7 or force generation device 7a of the grinder 2 via the effective connection 11.

The control unit 10 may also transmit additional sensed parameters, such as temperature, to the regulating unit.

The control unit 10 and/or the server 15 are designed to perform various evaluations from the target values, acquired measuring signals and actuating signals, such as fineness adjustment for bean changes, extraction time of the coffee cake, compensation of thermal expansion effects, actual position determination of the grinder 2, continuous diagnosis of wear effects on the grinders 3, 4 for e.g. maintenance planning.

FIG. 4 shows a variant of the invention described above, wherein both the fineness adjustment 7 and the force generation device 7a are used.

The invention is not limited by the above exemplary embodiment, but is modifiable within the scope of the claims.

Thus, the grinding process shown above can also be constructed analogously to a conventional grinder. A sensor is then arranged behind one of the grinding tools (e.g. load cell, hydraulic pressure sensor), which determines the force during the grinding process.

LIST OF REFERENCE SIGNS

1 Grind size adjustment assembly
2 Grinder
2a Grinder axis
3, 4 Grinding disc
5 Ejection section
6 Drive unit
7 Fineness adjustment
7a Force generation device
7b Force storage element
8 Coffee bean
9 Feed hopper
10 Control unit
11 Effective connection
12 Sensor device
12a Measured variable
12b Measuring signal
13, 14 Transmission link
15 Server
16 Control loop
17 Telemetry control loop
18 Telemetry link
C Cloud
F Force
MS Grinding gap
M1, M2 Grinding disc carrier
VS1 . . . 3 Method step
X Pretensioning travel

The invention claimed is:

1. A grind size adjustment assembly (1) comprising at least one coffee machine having at least one grinder (2) for grinding coffee beans (8), wherein the at least one grinder (2) comprises a first grinding disc (3), a second grinding disc (4) and a drive unit (6), the grinding unit being configured to rotatably drive at least one of the two grinding discs (3, 4), as well as a control unit (10), wherein the grind size adjustment assembly (1) further comprises at least one server (15) and the at least one grinder (2) comprises at least one sensor device (12), wherein the control unit (10) has a regulating unit and, together with the sensor device (12) and a force generation device (7a) of the grinder (2), forms a control loop (16) configured for regulating a grind size of the grinder (2), and wherein the at least one server (15) is designed in such a way that the at least one server (15) transmits to the control unit (10) predetermined data for the force generation device (7a) of the grinder (2).

2. The grind size adjustment assembly (1) according to claim 1, wherein the sensor device (12) forms or comprises at least one indication of the force generation device (7a) of the grinder (2) of the coffee machine.

3. The grind size adjustment assembly (1) according to claim 1, wherein the at least one server (15) is a service provider.

4. The grind size adjustment assembly (1) according to claim 1, wherein the at least one server (15) is a higher-level control device and is connected to the coffee machine via the control unit (10) in a wired or/and wireless manner.

5. The grind size adjustment assembly (1) according to claim 1, wherein the control unit (10) is configured as an interface that transmits data from the sensor device (12) to the at least one server (15) and receives data from the server (15).

6. The grind size adjustment assembly (1) according to claim 1, wherein the control loop further includes a fineness adjustment device (7) of the grinder (2), and wherein the at least one server (15) is designed in such a way that the at least one server (15) transmits to the control unit (10) predetermined data for the fineness adjustment (7) and the force generation device (7a) of the grinder (2).

7. The grind size adjustment assembly (1) according to claim 6, wherein the at least one server (15) has a regulating unit and forms the control loop (17) with the control unit (10), the sensor device (12), and the fineness adjustment (7) and the force generation device (7a) of the grinder (2) for regulating a grind size of the grinder (2).

8. The grind size adjustment assembly (1) according to claim 1, wherein the control unit (10) is connected to the at least one server (15) via a telemetry link (18), wherein the grind size adjustment assembly (1) forms a telemetric grind size adjustment assembly (1).

9. The grind size adjustment assembly (1) according to claim 8, wherein the at least one coffee machine comprises at least two coffee machines, and wherein the at least one server (15) is connected to the at least two coffee machines by means of the telemetry link (18) and controls their respective grinders (2) and evaluates their data.

10. The grind size adjustment assembly (1) according to claim 1, wherein the at least one server (15) carries out monitoring of the grinder (2) by means of the data received from the control unit (10).

11. The grind size adjustment assembly (1) according to claim 1, wherein the at least one server (15) is arranged in a cloud (C).

12. A method for adjusting the grind size of a grind size adjustment assembly (1) having a coffee machine with a grinder and a control unit, comprising the method steps of (VS1) inputting a reference variable (target value) for a grind size of the grinder (2) into a force generation device (7a) of grinding tools (3, 4) of the grinder (2) of the coffee machine before operation or during operation of the grinder (2);

(VS2) detecting forces or/and positions of the grinder (2) by means of a sensor device (12), generating a corresponding indication signal of force generation device (7*a*); and (VS3) comparing the indication signal thus obtained with the reference variable (target value) or with a reference variable obtained from a server (15), and setting the force generation device (7*a*) of the grinder (2) of the coffee machine for adjusting the grind size of the grind size adjustment assembly (1), wherein the control unit (10) has a regulating unit and, together with the sensor device (12) and the force generation device (7*a*) of the grinder (2), forms a control loop (16) configured for regulating the grind size of the grinder (2), and wherein the server (15) is designed in such a way that the server (15) transmits to the control unit (10) predetermined data for the force generation device (7*a*) of the grinder (2).

13. A method for telemetrically adjusting a grind of a grind size adjustment assembly comprising a coffee machine with at least one grinder and a control unit, and a server, comprising the method steps of (VS1) inputting a reference variable (target value) for a grind size of the grinder (2) before operation or during operation of the grinder (2) into a regulating unit of the control unit (10) or of the server (15) communicating with the control unit (10), wherein the regulating unit adjusts grinding tools (3, 4) of the grinder (2) via a force generation device (7*a*) via an actuating signal;

(VS2) detecting forces or/and positions of the grinder (2) by means of a sensor device (12), generating a corresponding measuring signal (12*b*) and forwarding the measuring signal (12*b*) to the regulating unit; and (VS3) comparing the measuring signal (12*b*) thus obtained with the reference variable (target value) and forming a corresponding control signal for controlling the grind size of the grinder (2), wherein the regulating unit, together with the sensor device (12) and the force generation device (7*a*) of the grinder (2), forms a control loop (16) configured for regulating the grind size of the grinder (2), and wherein the server (15) is designed in such a way that the server (15) transmits to the control unit (10) predetermined data for the force generation device (7*a*) of the grinder (2).

14. The method according to claim 13, wherein the measuring signal (12*b*) is transmitted by the control unit (10) via a telemetry link (18) to the server (15) in a cloud (C), and wherein the server (15) transmits the control signal via the telemetry link (18) to the control unit (10).

15. The method according to claim 14, wherein the control unit (10) transmits additionally detected parameters to the server (15), wherein the server (15) performs different evaluations from the values thus obtained, detected measuring signals and actuating signals.

* * * * *